United States Patent [19]

Vu

[11] Patent Number: 4,710,560

[45] Date of Patent: Dec. 1, 1987

[54] POLYURETHANE COATING COMPOSITION

[75] Inventor: Cung Vu, Gaithersburg, Md.

[73] Assignee: W. R. Grace & Co., New York, N.Y.

[21] Appl. No.: 904,732

[22] Filed: Sep. 8, 1986

[51] Int. Cl.[4] ............................................. C08G 18/12
[52] U.S. Cl. .................... 528/67; 427/385.5; 427/388.2; 428/423.1; 428/425.8; 528/73; 528/76; 528/77
[58] Field of Search ........................ 528/67, 73, 76, 77; 427/385.5, 388.2; 428/423.1, 425.8

[56] References Cited

U.S. PATENT DOCUMENTS

| | | | |
|---|---|---|---|
| 3,422,054 | 1/1969 | Kelly | 528/77 |
| 3,919,173 | 11/1975 | Coyner et al. | 528/77 |
| 3,933,725 | 1/1976 | Dearlove et al. | 528/77 |
| 4,145,515 | 3/1979 | Pogozelski et al. | 528/77 |

*Primary Examiner*—Maurice J. Welsh
*Attorney, Agent, or Firm*—Richard P. Plunkett; William W. McDowell, Jr.

[57] ABSTRACT

This invention relates to a moisture curable, isocyanate terminated, branched prepolymer which is the reaction product of (a) an alcohol having two or three —OH groups, (b) a hydrophobic polymeric diol or triol and (c) at least one polyisocyanate, said prepolymer having an NCO content in the range 0.3 to 1.0 meq/q. Exposure of the prepolymer as a coating on a substrate to moisture under atmospheric conditions results in a cured coating having excellent adhesion to the substrate and excellent abrasion resistance.

16 Claims, No Drawings

POLYURETHANE COATING COMPOSITION

BACKGROUND OF THE INVENTION

This invention relates to a process for forming a crosslinked polyurethane. More particularly, this invention relates to a crosslinked, polyurethane of 100% solids content which can be formulated into products usable in the coatings field.

OBJECTS OF THE INVENTION

One object of the invention is to prepare a hydrophobic, crosslinked polyurethane. Another object of the invention is to prepare a hydrophobic, crosslinked polyurethane having a 100% solids content. Still another object of the invention is to prepare a hydrophobic, crosslinked polyurethane which will result in a corrosion inhibiting coating on exposure to moisture at atmospheric conditions. Yet another object of the invention is to produce a stable, hydrophobic, crosslinked polyurethane which results in a film coating on curing having excellent abrasion resistance. Other objects will become apparent from a reading hereinafter.

DESCRIPTION OF THE INVENTION

Briefly, this invention involves forming a branched prepolymer having more than 2, e.g., 2.1, terminal isocyanate groups.

The average molecular weight of the prepolymer used can be from about 1,500 to about 15,000.

In practicing the instant invention, the alcohol, the hydrophobic, polymeric diol or triol and polyisocyanate are admixed in a mole ratio in the range 1:2.6–6.0:4-.6–9, respectively.

In practicing one embodiment of the invention, the prepolymer is prepared by charging six moles of an aromatic isocyanate, e.g., toluene diisocyanate (TDI), three moles of an aliphatic isocyanate, e.g., isophorone diisocyanate (IPDI), six moles of a hydrophobic polyol, e.g., polypropylene glycol (PPG) and one mole of an alcohol having 3 —OH groups, e.g., triethanolamine (TEA), to a stirred container and let the reaction continue for about 6 hours. During the reaction an exotherm up to about 45° C. occurs. To force the reaction to near completion, a urethane forming catalyst, e.g., dibutyltindilaurate (DBTDL), can be added to the system in small amounts. Due to the reaction rates, the following reactions are believed to occur sequentially:

(1) Triethanolamine reacts with the aromatic isocyanate.

(2) The polypropylene glycol reacts with a substantial portion of the aromatic isocyanate.

(3) The aliphatic isocyanate reacts with the remaining —OH groups of the polypropylene glycol.

The reactions are carried out neat, preferably in an inert atmosphere such as nitrogen to insure the absence of moisture.

Due to the reaction rates, a preponderance of a prepolymer having the following idealized structure is obtained:

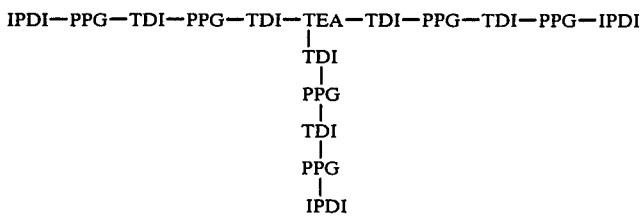

For certain applications where somewhat different properties are required, an alternate route for preparing the prepolymers of this invention may be used. That is, the prepolymer can be prepared from a tertiary amine-containing alcohol, e.g., triethanolamine (TEA) or one having only two hydroxyl groups, or from blends (mixtures) of such dihydroxy tertiary amines with various trihydroxy alcohol compounds including trihydroxy tertiary amines. This alternate route is exemplified as follows:

To a stirred reactor is charged two moles of an aromatic isocyanate, e.g., a polymethylene polyphenylisocyanate having an average —NCO functionality of 2.3 and commonly referred to as polymeric MDI (PMDI), 2.6 moles of an aliphatic isocyanate, e.g., isophorone diisocyanate (IPDI), 2.6 moles of a hydrophobic polyol, e.g., polypropylene glycol (PPG), and one mole of an amine-containing alcohol having two —OH groups, e.g., N-methyldiethanolamine (NMDEA). The reaction is continued for a time sufficient to reduce the NCO content to at least about 0.4 meq/g. During the reaction an exotherm up to about 45° C. occurs. To force the reaction to near completion, a urethane-forming catalyst, e.g., dibutyltindilaurate (DBTDL) can be added to the system. Due to reaction rates of the aromatic and aliphatic polyisocyanates, the sequence of reactions outlined above will take place. As a result of the differential reaction rates, a prepolymer having the following idealized structure is obtained:

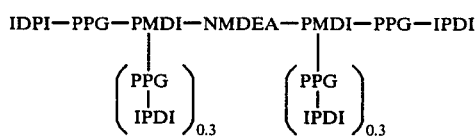

In practicing the preferred embodiment of the invention, the prepolymer is prepared by charging 9 moles of an aromatic isocyanate, e.g., toluene diisocyanate (TDI), 6 moles of a hydrophobic polyol, e.g., polypropylene glycol (PPG) and 1 mole of an alcohol having 3 —OH groups, e.g., trimethylolpropane (TMOP), to a stirred container and let the reaction continue for about 24 hours. During the reaction an exotherm up to about 55° C. occurs. A preponderance of a prepolymer having the following idealized structure is obtained:

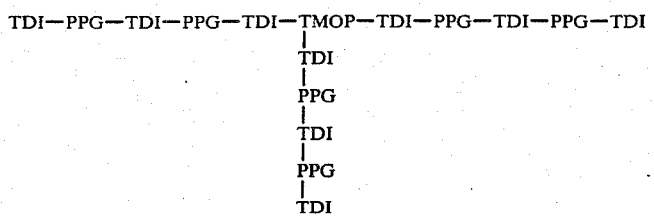

The aforestated reactions are carried out neat, preferably in an inert atmosphere such as nitrogen, to insure the absence of moisture.

For attainment of best physical properties (tensile strength, resiliency, abrasion resistance, solvent resistance, heat distortion resistance, outdoor weathering resistance and the like), it is critical that the prepolymers of the present invention be branched rather than linear in structure. Branched prepolymers, on subsequent moisture curing of applied coatings derived therefrom lead to the formation of crosslinked, elastomeric polyurethane products having a balance of the desirable physical properties outlined above. In the first and third example, above, the branching units were furnished by the triethanolamine and the trimethylolpropane (TMOP), whereas in the alternate route to form the prepolymer, the branching units were furnished by the polyfunctional polymeric MDI (PMDI). When NMDEA is used together with TDI or pure (non-polymeric) MDI, branching units may be supplied in various ways such as by incorporating into the starting composition small amounts of other polyfunctional reactive co-monomers such as glycerol, trimethylolethane, trimethylolpropane, pentaerythritol, toluene-2,4,6-triisocyanate, polymeric MDI and the like.

Stoichiometry of Prepolymer Step

Reactants are chosen by first selecting a central unit comprising an alcohol having two or three —OH groups. Such alcohols include, but are not limited to, trimethylolethane, trimethylolpropane, glycerol, pentaerythritol and the like. Tertiary amine alcohols operable herein to form the central portion of the prepolymer include, but are not limited to, N-alkylated diethanolamines, N-arylated diethanolamines and N-alkarylated diethanolamines of the formula:

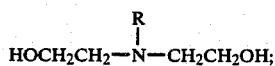

N-alkylated dipropanolamines, N-arylated dipropanolamines and N-alkarylated dipropanolamines of the formula:

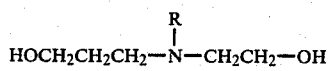

wherein said formulas R=alkyl having 1–18 carbon atoms or alkyl substituted or unsubstituted phenyl or benzyl; tripropanolamine, i.e., N—(CH$_2$CH$_2$CH$_2$—OH)$_3$; N,N-bis(2-hydroxyethyl)-piperazine, i.e.,

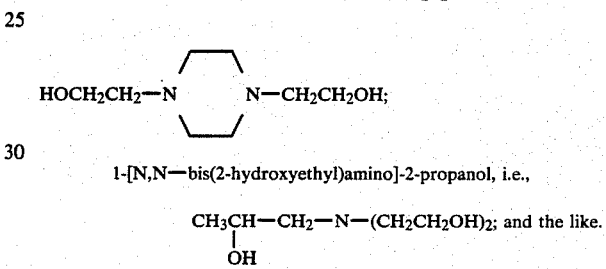

1-[N,N—bis(2-hydroxyethyl)amino]-2-propanol, i.e., $$CH_3\underset{OH}{CH}-CH_2-N-(CH_2CH_2OH)_2;\text{ and the like.}$$

Stoichiometry calls for an average of one alcohol residue, preferably containing three —OH groups per molecule of prepolymer. This is the key ingredient and is central in the molecular structure as shown in the schematics set out hereinbefore. This alcohol reactant can have three —OH groups or only two. As stated supra, it is also possible and sometimes expedient for achieving somewhat different properties to use mixtures (blends) of these and other dihydroxy and trihydroxy compounds or to use amine containing alcohols such as triethanolamine.

From the central alcohol moiety one builds the branched backbone of the prepolymer structure through selection of an appropriate polymeric hydrophobic polyol. This hydrophobic polyol is tied to the central alcohol moiety through bis-urethane linkages by use of diisocyanate reactants and is further end-capped with a diisocyanate through a monourethane linkage leaving a free —NCO group on each terminus of the prepolymer molecule. If a mixture of an aliphatic and an aromatic isocyanate is used, due to the difference in reactivity ratios of these reactants, the aliphatic moieties will predominate at the terminus locations since they react more slowly than aromatic isocyanates with —OH groups. The choice and positioning and ratio of hydrophobic polyol moieties in the prepolymer backbone is critical only in that it makes the prepolymer more hydrophobic and leads to a final average prepolymer molecular weight from about 1,500 to about 15,000.

Further clarification of the stoichiometry of the prepolymer formation step may be possible by illustrating the idealized schematics supra with the showing of the terminus —NCO functions as follows:

```
OCN—IPDI—PPG—TDI—PPG—TDI—TEA—TDI—PPG—TDI—PPG—IPDI—NCO
                              |
                             TDI
                              |
                             PPG
                              |
                             TDI
                              |
                             PPG
                              |
                             IPDI
                              |
                             NCO,

OCN—IDPI—PPG—PMDI—NMDEA—PMDI—PPG—IPDI—NCO
              |              |
           ( PPG )        ( PPG )
           ( IPDI )       ( IPDI )
           (  |  )0.3     (  |  )0.3
             NCO            NCO
``` and

```
OCN—TDI—PPG—TDI—PPG—TDI—TMOP—TDI—PPG—TDI—PPG—TDI—NCO
                         |
                        TDI
                         |
                        PPG
                         |
                        TDI
                         |
                        PPG
                         |
                        TDI
                         |
                        NCO
```

Obviously, mixtures of TMOP and NMDEA in the same prepolymer would lead to an even more complex structure than the ones exemplified herein.

The polyisocyanates used to form the prepolymer of the instant invention can be either aromatic or aliphatic polyisocyanates or mixtures thereof. Operable aromatic isocyanates include, but are not limited to, tolylene diisocyanate, triphenylmethane-4,4',4'''-triioscyanate, benzene-1,3,5-tri-isocyanate, toluene-2,4,6-triisocyanate, diphenyl-2,4,4'-tri-isocyanate, xylene diisocyanate, chlorophenylene diisocyanate, diphenylmethane-4,4'-diisocyanate, naphthalene-1,5-diisocyanate, xylene-alpha, 3,3-dimethyl-4,4'-biphenylene diisocyanate, 3,3'-dimethoxy-4,4'-bi-phenylene diisocyanate, 2,2',5,5'-tetramethyl-4,4'-bi-phenylene diisocyanate, 4,4'-methylene bis(phenyl-isocyanate), 4,4'-sulfonyl bis(-phenylisocyanate) and 4,4'-methylene diorthotolylisocyanate.

As used herein, the term aliphatic polyisocyanate not only includes conventional aliphatic isocyanates such as isophorone diisocyanate, hexamethylene diisocyanate and hydrogenated methylene dicyclohexyl diisocyanate, but also includes all isocyanate structures where the NCO group is no directly attached to an aromatic ring. Thus, the term includes cycloaliphatic diisocyanates such as isophorone diisocyanate (IPDI) and it also includes structures such as:

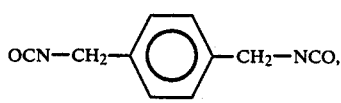

-continued

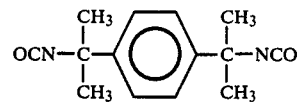

and the like. Additional operable aliphatic isocyanates include ethylene diisocyanate, trimethylene diisocyanate, dicyclohexyl methane-4,4'-diisocyanate and 2,2,4-trimethyl-1,6-hexane diisocyanate.

When a mixture of aromatic and aliphatic polyisocyanates are used to form the prepolymer, the ratio of aromatic to aliphatic diisocyanates are usually present in approximately 2 to 1 molar amounts in the preferred embodiment, but may be varied from this ratio to improve properties or achieve lower costs. The mole ratio of the aromatic isocyanate to the aliphatic isocyanate operable herein can be in the range 1:0.5–1.3.

The products of this invention are intended for use in making corrosion inhibiting coatings having abrasion resistance. Thus, it is critical in achieving these objectives that the coatings be hydrophobic and relatively impermeable to moisture. Because the major backbone elements of the prepolymer structure are comprised of high molecular weight polymeric polyols, these polyols are chosen to be hydrophobic. By virtue of ready availability and low cost, the polyalkylene ether diols and triols are the preferred polymeric polyols of this invention. It is well known in the art, however, that polyethylene glycols are water soluble and hydrophilic, and are therefor to be avoided for the purposes of this invention, as are copolymers of ethylene oxide with higher alkylene oxides wherein the ethylene oxide content is greater than about 40 mole percent. Thus, it is important that the admixtures of polymeric polyols used to make the prepolymer be sufficiently hydrophobic as to be immiscible, i.e., forms two layers, when mixed with an equal volume of water. Hydrophobic polyols operable herein to form the prepolymer include, but are not limited to, polyalkylene-ether diols and triols, especially polypropylene glycols, polybutylene glycols and polytetramethylene ether glycols of M.W. 400–4,000; poly(caprolactone)diols and triols of M.W. 500–3,000; hydroxy-terminated poly(ethylene adipate) of M.W. 500–3,000; hydroxy-terminated poly(1,4-butylene adipate) of M.W. 500–3,000; poly(butadiene diol) of M.W. 500–3,000 and the like.

The following examples will explain, but expressly not limit, the instant invention. Unless otherwise noted, all parts and percentages are by weight.

EXAMPLE 1

104 g of toluene diisocyanate (TDI) 66.99 g of isophorone diisocyanate (IPDI), 15.4 g of triethanolamine (TEA) and 614 g of polypropylene glycol (PPG) having a molecular weight of 1025 were added to a 2-liter stirred reactor. After 30 minutes the initial mild exotherm subsided and 1.4 g of dibutyltin dilaurate (DBTDL) were added dropwise to maintain the temperature below 130° F. The reaction was stopped when the NCO level was at 0.348 meq/g. The prepolymer was coated on electrocoated steel panels by means of a drawbar which formed a layer of a 10–30 mils coating that was fully cured by moisture at room temperature in about a week.

EXAMPLE 2

606 g of PPG (MW 1025 and having 0.2 wt.% of carbon black dispersed in it by ultrasound), 15.4 g of TEA and 104 g of TDI were added to a 2-liter stirred reactor. After 50 minutes the tin catalyst (DBTDL) was added dropwise (total 0.065 g) to maintain the temperature below 120° F. When the NCO level was at 0.59, 66.6 g of IPDI were added in three lots to maintain the temperature below 120° F. The reaction was stopped when the NCO level was at 0.43 meq/g and the product was discharged and coated on panels.

EXAMPLE 3

614 g of PPG (MW 1025 and having 0.3 wt.% of carbon black dispersed in it by ultrasound), 15.5 g of TEA and 104 g of TDI were added to a 2-liter stirred reactor. After 40 minutes, 0.21 g of DBTDL catalyst was added dropwise to maintain the temperature below 120° F. When the NCO level was at 0.425 meq/g, 66.6 g of IPDI were added in three lots to maintain the temperature below 120° F. The reaction was stopped when the NCO level was at 0.40 meq/g and the product was discharged and coated on panels.

EXAMPLE 4

614 g of PPG (MW=1025) 15.57 g of TEA and 98.8 g of TDI were added to a 2-liter stirred reactor. After 50 minutes, 0.16 g of DBTDL catalyst was added dropwise to maintain the temperature below 120° F. When the NCO level was at 0.278 meq/g, 66.6 g of IPDI were added in three lots to maintain the temperature below 120° F. The reaction was stopped when the NCO level was at 0.372 meq/g and the product was discharged and coated on panels.

EXAMPLE 5

614 g of PPG (MW 1025 and having 0.3 wt.% of carbon black dispersed in it by ultrasound) 15.57 g of TEA and 98.8 g of TDI were added to a 2-liter reactor. After 25 minutes 0.18 g of DBTDL catalyst was added dropwise to maintain the temperature below 120° F. When the NCO level was at 0.284 meq/g, 66.6 g of IPDI were added in three lots to maintain the temperature below 120° F. The reaction was stopped when the NCO level was at 0.364 meq/g and the product was discharged and coated on panels.

EXAMPLE 6

156 g of TDI and 13.4 g of TMOP were mixed with 614 g of PPG (1025 MW containing 0.2% wt. carbon black). The reaction was allowed to proceed and temperature controlled below 160° F. The reaction was stopped when the NCO level was 0.43 meq/g and the product discharged and coated on panels.

EXAMPLE 7

12,875 g of PPG (MW 1025), 325 g of TEA and 2,090.5 g of TDI were added to a 5-gallon reactor. After 100 minutes 1.86 g of DBTDL catalyst was added slowly to maintain the temperature below 120° F. When the NCO level was at 0.118 meq/g, 1,399 g of IPDI were added slowly to maintain the temperature below 120° F. The reaction was stopped when the NCO level was at 0.381 meq/g and the product was discharged.

EXAMPLE 8

312 g of TDI and 26.8 g of TMOP were mixed with 1,228 g of PPG (1,025 MW). The reaction was allowed to proceed and the temperature was maintained below 160° F. The reaction was stopped when the NCO level was 1.0 meq/g. The product was discharged and coated on electrocoated steel panels.

The hydrophobic polyurethane of the instant invention can be used per se or may be formulated with conventional additives to form abrasion resistant, anticorrosive coatings. Such coatings can be used on various substrates including metals, wood, glass, concrete, plastic, fabric, fiber, paper and the like including surfaces previously coated or painted with other types of coating materials. One field in which the coatings are especially useful is in the automotive industry. Therein the formulated polyurethane can be used as underbody coatings, chip-resistant coatings, rocker panel coatings, wheel well coatings and for wash-resistant replacements for cavity conservation waxes. The products of the present invention are durable, wear-resistant, corrosion protective and do not contain any solvent which may contribute to air pollution during application in the factory environment.

In formulating the coatings, conventional additives such as thinners, thixotropic agents, antioxidants, anti-blistering agents, pigments or dyes, anti-UV agents, anticorrosion additives and possibly extending "fillers" (inorganic powders, oils, resins), reinforcing agents (fibers, platelets, crosslinkers, latexes), thickeners, plasticizers and the like can be added to the prepolymer.

The additives are each added in amounts ranging from about 0.01 to 25% by weight of the prepolymer. The additives can be added during prepolymer formation but, preferably, are added after the prepolymer is formed by adding each additive with stirring for about 1 to 10 minutes.

The liquid coatings applied can be moisture cured at room temperature in about 2–3 hours, and fully cured coatings are obtained in about 2–7 days at atmospheric conditions.

The coatings are tested for abrasion resistance in both the dry and wet state on a Shot Blaster manufactured by Auer, Mannheim, West Germany (Model Strahlanlage-ST800A). The wet coatings to be tested are soaked in a water bath for 24 hours prior to abrasion testing.

The Shot Blaster abrasion test is the same for both the dry and wet panels. The test consists of shot blasting the urethane polymer coated panel with a crushed spherical cast steel shot type GP-14 Wheelabrator-Allevard at an air pressure of 35 psi at an angle of 60° until full penetration of the coating to expose bare steel is visibly noted. For dry or wet samples of 15-mil thickness, a blasting period in excess of 200 seconds is considered commercially acceptable.

The prepolymers were coated on 4"×12" steel panels electrocoated with a composition, commercially available from PPG under the tradename "3150 and 3150A". The coatings were fully moisture-cured at room temperature in 2 days and then tested for abrasion resistance in the wet and dry state in accord with the procedure set out supra for the shot blaster abrasion test. The results are set forth in Example 9.

EXAMPLE 9

The coatings on panels from Examples 1 to 6 were allowed to fully moisture cure and then be exposed to the shot blaster abrasion test (dry and wet). The results are set forth in TABLE I.

TABLE I

| Coating from Example | Dry Test Thickness to pass 200 seconds (mils) | Wet Test Thickness to pass 200 seconds (mils) |
|---|---|---|
| 1 | 19.3 | 13.1 |
| 2 | 8.4 | 9.9 |
| 3 | 9.4 | 6.6 |
| 4 | 11.2 | 12.0 |
| 5 | 5.8 | 9.2 |
| 6 | 14.6 | 12.6 |

(dry and wet results)

EXAMPLE 10

To simulate different environmental conditions, panels with a cured coating of the prepolymer of Example 2 (average thickness of 0.015") were conditioned for 24 hours separately at room temperature; at −30° C.; at 100° F. and 100 relative humidity.

The cured panels were then subjected to a dry gravelometer abrasion test in accord with SAE J-400 with 5 pints of gravel. The thus abraded panels were then placed in a salt fog chamber (a Singleton SCCH Corrosion Test Cabinet, manufactured by the Singleton Corp., Cleveland, Ohio). The Salt Spray (Fog) Test was run in accord with the procedure of ASTM B117-73. The cabinet contained a salt solution of 5 parts by weight NaCl in 95 parts distilled water and was maintained in the exposure zone at a temperature in the range 33.3°–36.1° C. The exposure time in the cabinet was 24 hours. On examination of the panel for rust spots, none were found.

Standard commercial underbody coating compositions based on mineral filled polyvinylchloride plastisols required a coating thickness of 0.040" in order to prevent similar damage of the electrocoat coating leading to the onset of corrosion.

The prepolymers of the present invention possess excellent adhesive properties as is illustrated by the following example:

EXAMPLE 11

A strip of brass screen (0.020 mesh), 1"×10", is taped to both ends of electrocoated steel panels (1"×5") leaving an excess of screen at one end. The prepolymers from Example 2 and Example 6 were each applied to a separate panel through the screen to mesh with the panel substrate and then moisture-cured. After curing the tape is removed from the end with the excess screen allowing it to be peeled at 180° from the panel. The peeled adhesion measured for these prepolymers is shown in TABLE II:

TABLE II

|  | Peel adhesion (kg/in) | |
|---|---|---|
|  | Dry | Wet |
| Prepolymer from Example 2 | 7.27 | 6.91 |
| Prepolymer from Example 6 | 6.42 | — |

By visual analysis, the materials remained bonded to the panel with the excess remaining on the screen.

I claim:

1. A moisture-curable composition comprising an isocyanate terminated, branched prepolymer which is the reaction product of
   (a) an alcohol having two or three —OH groups,
   (b) a hydrophobic polymer diol or triol, and
   (c) at least one polyisocyanate,
said prepolymer having an NCO content in the range 0.3 to 1.0 meq/g, the mole ratio of (a), (b) and (c) being in the range 1:2.6–6.0:4.6–9, respectively.

2. The composition of claim 1 wherein (a) is an amine containing alcohol having two or three —OH groups.

3. The composition according to claim 1 wherein
   (a) is trimethylolpropane
   (b) is polypropylene glycol, and
   (c) is a mixture of isophorone diisocyanate and toluene diisocyanate.

4. The composition according to claim 1 wherein
   (a) is trimethylolpropane,
   (b) is polypropylene glycol, and
   (c) is toluene diisocyanate.

5. A moisture-curable composition comprising an isocyanate terminated, branched prepolymer which is the reaction product of
   (a) triethanolamine,
   (b) polypropylene glycol, and
   (c) a mixture of isophorone diisocyanate and toluene diisocyanate,
said prepolymer having an NCO content in the range 0.3 to 1.0 meq/g, the mole ratio of (a), (b) and (c) being in the range 1:2.6–6.0:4.6–9, respectively.

6. The process of forming a coating on a substrate which comprises coating said substrate with a moisture curable, isocyanate terminated, branched prepolymer which is the reaction product of
   (a) an alcohol having two or three —OH groups,
   (b) a hydrophobic polymeric diol or triol, and
   (c) at least one polyisocyanate,
said prepolymer having an NCO content in the range 0.3 to 1.0 meq/g, the mole ratio of (a), (b) and (c) being in the range 1:2.6–6.0:4.6–9, respectively, and exposing said coating to moisture at atmospheric conditions for a time sufficient to obtain a cured coating.

7. The cured coating resulting from the process of claim 6.

8. An automotive underbody coating prepared by the process of claim 6.

9. A chip-resistant underbody coating prepared by the process of claim 6.

10. A wash-resistant automotive cavity conservation coating prepared by the process of claim 6.

11. The composition of claim 1 containing in addition at least one functional additive selected from the group consisting of thinners, thixotropic agents, antioxidants, antiblistering agents, pigments, dyes, anti-UV agents, anticorrosion additives, fillers, reinforcing agents, thickeners and plasticizers in amounts ranging from about 0.01 to 25% by weight of the prepolymer.

12. A substrate having as a coating thereon the cured composition of claim 1.

13. The process according to claim 6 wherein (a) is an amine containing alcohol having two or three —OH groups.

14. The process according to claim 6 wherein
(a) is trimethylolpropane,
(b) is polypropylene glycol, and
(c) is a mixture of isophorone diisocyanate and toluene diisocyanate.

15. The process according to claim 6 wherein
(a) is trimethylolpropane,
(b) is polypropylene glycol, and
(c) is toluene diisocyanate.

16. The process of forming a coating on a substrate which comprises coating said substrate with a moisture curable, isocyanate terminated, branched prepolymer which is the reaction product of
(a) triethanolamine,
(b) polypropylene glycol, and
(c) toluene diisocyanate,
said prepolymer having an NCO content in the range 0.3 to 1.0 meq/g, the mole ratio of (a), (b) and (c) being in the range 1:2.6–6.0:4.6–9, respectively, and exposing said coating to moisture at atmospheric conditions for a time sufficient to obtain a cured coating.

* * * * *